United States Patent [19]

Matsumoto et al.

[11] 4,245,079
[45] Jan. 13, 1981

[54] CURABLE ORGANOPOLYSILOXANE COMPOSITION

[75] Inventors: Yasuji Matsumoto; Bunjiro Murai, both of Ohta, Japan

[73] Assignee: Toshiba Silicone Co., Ltd., Tokyo, Japan

[21] Appl. No.: 12,827

[22] Filed: Feb. 16, 1979

[51] Int. Cl.³ .............................................. C08G 77/06
[52] U.S. Cl. ............................... 528/15; 260/37 SB; 528/31; 528/32; 528/33; 428/429; 428/447; 428/450
[58] Field of Search ............. 528/15, 31, 32, 33; 260/37 SB

[56] References Cited

U.S. PATENT DOCUMENTS

| | | | |
|---|---|---|---|
| 3,996,195 | 12/1976 | Sato et al. | 528/15 |
| 4,077,943 | 3/1978 | Sato et al. | 528/15 |
| 4,082,726 | 4/1978 | Mine et al. | 528/31 |

Primary Examiner—Melvyn I. Marquis
Attorney, Agent, or Firm—Blanchard, Flynn, Thiel, Boutell & Tanis

[57] ABSTRACT

A curable organopolysiloxane composition comprises (A) an organopolysiloxane having at least two alkenyl groups bonded to silicon atoms in which the silicon atom is attached to a monovalent hydrocarbon group containing a trialkoxysilyl group, an epoxy group or an ester group, (B) an organohydrogenpolysiloxane having at least three hydrogen atoms bonded to silicon atoms and (C) a catalyst of platinum or a compound thereof. It is improved in respect to the adhesion to metal, glass and plastics.

34 Claims, No Drawings

CURABLE ORGANOPOLYSILOXANE COMPOSITION

The present invention relates to a curable organopolysiloxane composition which is cured at a relatively low temperature and tightly bonded to a substrate such as a metal, glass or plastic.

Silicone elastomers and silicone resins which are cured by reaction of hydrosilyl groups with alkenyl groups, especially vinyl groups, bonded to silicon atoms have the excellent heat resistance and electrically insulating properties inherent of silicones, and curing of these rubbers and resins can easily be promoted by heating. Accordingly, they are suitable for mass production of molded and coated articles and they are widely used in various fields, especially in the electric and electronic industries. Conventional silicone elastomers and silicone resins curable by the abovementioned reaction, however, are poor in the adhesion to substrates, and therefore, their applications have been inevitably limited.

As means for improving the bondability to substrates, there have heretofore been proposed (1) a method in which a substrate is treated with a primer and (2) a method in which an adhesion promoter is incorporated into a silicone elastomer or silicone resin to impart a self-bonding property thereto. The former method, however, is defective in that the process steps are complicated and the method is therefore not suitable for mass production, and that since a solvent is ordinarily used for the primer, care should be paid to the igniting property or the poisoning property of the primer. Although various researches have heretofore been made on the latter method, in many cases, a silane or siloxane having a relatively low molecular weight is added as the adhesiveness-imparting agent. Accordingly, the characteristic properties of the silicone elastomer or silicone resin are degraded, or when the composition is heated and cured, such additive component is evaporated and no satisfactory bonding effect can be obtained. Further, in some cases, the effect of the adhesion promoter cannot be sufficiently attained unless another additive component is further added. For example, when semi-conductors are potted, low molecular weight silanes and siloxanes evaporate and affect other components existing with them. Thus, satisfactory results cannot always be obtained according to the latter method.

We made researches with a view to eliminating the foregoing defects and disadvantages, and as a result, we succeeded in developing a curable organopolysiloxane composition which is formed only by introducing siloxane units effective for imparting an adhesiveness into a base polymer. The composition comprises three components, i.e., a base polymer, a cross-linking agent and a catalyst. The composition can be cured by conducting heating at a relatively low temperature for a short time and it can be bonded to metals, glass, plastics and the like without addition of an adhesion-promoting low-molecular-weight compound.

More specifically, in accordance with the present invention, there is provided a curable organopolysiloxane composition consisting essentially of (A) an organopolysiloxane containing in the molecule at least one unit represented by the following general formula:

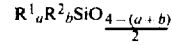

wherein $R^1$ stands for a substituted or unsubstituted monovalent hydrocarbon group, $R^2$ stands for a monovalent hydrocarbon group substituted with a trialkoxysilyl group bonded to the silicon atom through at least 2 carbon atoms, a monovalent hydrocarbon group substituted with an epoxy group or a monovalent hydrocarbon group substituted with an ester group bonded to the silicon atom through at least 1 carbon atom, a is 0, 1 or 2, b is 1 or 2, and the sum of a and b (a+b) is 1, 2 or 3, said organopolysiloxane also containing in the molecule at least 2 alkenyl groups bonded to silicon atoms and having a viscosity of 50 to 1,000,000 cP as measured at 25° C., (B) an organohydrogenpolysiloxane having units represented by the following general formula:

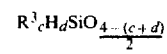

wherein $R^3$ stands for a substituted or unsubstituted monovalent hydrocarbon group, c is 0, 1 or 2 and d is 1 or 2, and containing in the molecule at least 3 hydrogen atoms bonded to silicon atoms, the amount of said organohydrogenpolysiloxane being such that 0.5 to 4.0 of hydrogen atoms bonded to silicon atoms are provided per alkenyl group in the component (A), and (C) a catalyst selected from the group consisting of platinum and platinum compounds in an amount of 1 to 100 ppm as platinum based on the component (A).

The organopolysiloxane used as the component (A) in the present invention is fundamentally a base polymer of a so-called addition type organopolysiloxane composition, which contains in the molecule at least 2 alkenyl groups bonded to silicon atoms, and the present invention is characterized in that siloxane units containing the group $R^2$ bonded to the silicon atom are introduced in the above base polymer so as to impart adhesiveness thereto. $R^2$ stands for a monovalent hydrocarbon group substituted with a trialkoxysilyl group bonded to the silicon atom through at least 2 carbon atoms. For example, a group $(R^4O)_3SiCH_2CH_2-$ in which $R^4$ stands for a monovalent linear or branched hydrocarbon group having from one to four carbon atoms can be mentioned as $R^2$. It is especially preferred that $R^4$ be a methyl, ethyl or propyl group. These monovalent hydrocarbon groups substituted with trialkoxysilyl groups may be the same or different, and they are introduced into the above-mentioned siloxane as organic groups constituting monofunctional, bifunctional and/or trifunctional siloxane units in the organopolysiloxane.

As another example of $R^2$, there can be mentioned a monovalent hydrocarbon group substituted with an epoxy group, especially an epoxy group bonded to the silicon atom through at least 3 carbon atoms, optionally through an interposed oxygen atom of the ether linkage. For example, there can be mentioned a γ-glycidyloxypropyl group and a β-(3,4-oxycyclohexyl) ethyl group. These monovalent hydrocarbon groups substituted with epoxy groups may be the same or different, and they are introduced into the above-mentioned siloxane as organic groups constituting monofunctional, bifunctional and/or trifunctional siloxane units in the organopolysiloxane.

As still another example of R², there can be mentioned a monovalent hydrocarbon group substituted with an ester group bonded to the silicon atom through at least 1 carbon atom. For example, the following groups can be mentioned:

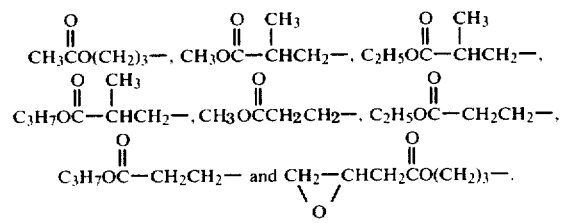

A group having a trialkoxysilyl group and an ester group can be mentioned as still another example of R². A group having the following formula:

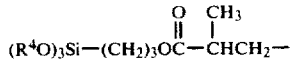

wherein R⁴ stands for an above-mentioned monovalent hydrocarbon group, preferably a methyl, ethyl or propyl group, is preferred as such group to impart an excellent adhesion properties.

These monovalent hydrocarbon groups substituted with ester groups may be the same or different, and they are introduced in the above-mentioned siloxane as organic groups constituting monofunctional, bifunctional and/or trifunctional siloxane units in the organopolysiloxane.

As R¹ and the organic groups bonded to the silicon atoms of other siloxane units, there can be mentioned, for example, alkyl groups such as methyl, ethyl, propyl, butyl, hexyl and dodecyl groups, alkenyl groups such as vinyl and allyl groups, aryl groups such as a phenyl group, aralkyl groups such as styrenyl and α-methylstyrenyl groups, and halogen- and cyano-substituted hydrocarbon groups such as chloromethyl, 3,3,3-trifluoromethyl and β-cyanoethyl groups. From the viewpoints of easiness in the snythesis and maintenance of a low viscosity before curing while maintaining the degree of polymerization of the organopolysiloxane at a level necessary for providing good physical properties after curing, a methyl group is most preferred in addition to alkenyl groups described hereinafter. For effecting a cross-linking reaction by hydrosilylation, it is indispensable that among R¹ and the organic groups bonded to silicon atoms of other siloxane units, there should be present at least 2 alkenyl groups per molecule. From the viewpoint of easiness in the synthesis, a vinyl group is especially preferred as the alkenyl group. The alkenyl groups may be present on the terminal siloxane units or intermediate siloxane units of the molecular chain of the organopolysiloxane or on both of them. In order to impart excellent mechanical properties to the cured composition, it is preferred that the alkenyl groups be present at least on the terminal siloxane units.

The organopolysiloxane may be any of linear, partially cyclized linear, branched and cyclic organopolysiloxanes, or it may be a mixture of two or more of them. In order to obtain a composition suitable for casting, coating impregnation or other molding, especially a composition having an appropriate flow property before curing and excellent physical properties after curing, it is essential to use a linear, partially cyclized linear or branched polysiloxane having a viscosity of 50 to 1,000,000 cP, particularly 100 to 10,000 cP, as measured at 25° C. From the viewpoint of easiness in the snythesis, a linear or partially cyclized linear polysiloxane having a viscosity within the above range is especially preferred.

Such organopolysiloxane having alkenyl groups and trialkoxysilyl, epoxy or ester group-substituted hydrocarbon group can be prepared by an equilibration reaction or an addition reaction. In the case of the equilibration reaction, a low-molecular-weight organopolysiloxane having an alkenyl group is equilibrated with a low-molecular-weight organopolysiloxane having a trialkoxysilyl, epoxy or ester group-substituted hydrocarbon group in a non-protonic polar solvent such as dimethylformamide in the presence of a catalyst such as lithium hydroxide.

As the low-molecular-weight organopolysiloxane having an alkenyl group, there can be mentioned, for example, $CH_2=CH(CH_3)_2SiOSi(CH_3)_2CH=CH_2$, $[(CH_3)(CH_2=CH)SiO]_4$, and $CH_2=CH(CH_3)_2SiO[(CH_3)_2SiO]_{20}Si(CH_3)_2CH=CH_2$.

As the low-molecular-weight organopolysiloxane having a trialkoxysilyl group-substituted hydrocarbon group, there can be mentioned, for example, the following compounds:

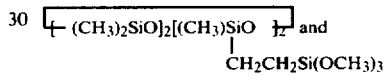

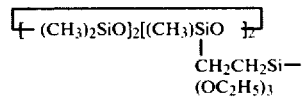

As the low-molecular-weight organopolysiloxane having an epoxy group-substituted hydrocarbon group, there can be mentioned, for example, the following compounds:

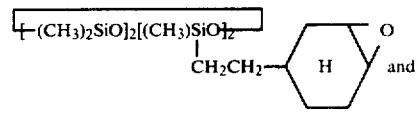

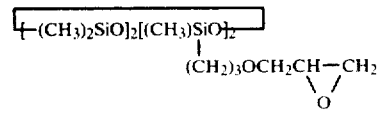

As the low-molecular-weight organopolysiloxane having an ester group-substituted hydrocarbon group, there can be mentioned, for example, the following compounds:

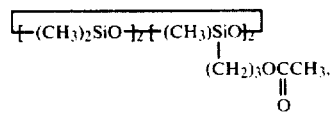

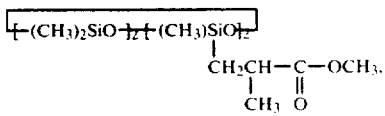

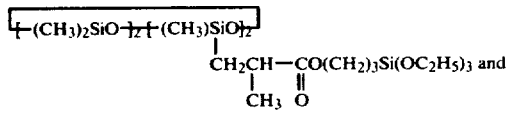

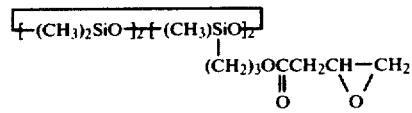

In the case of the addition reaction, an organopolysiloxane having an alkenyl group is hydrosilylated with an organohydrogenpolysiloxane having in the molecule a trialkoxysilyl, epoxy or ester group-substituted hydrocarbon group and a hydrogen atom bonded to the silicon atom, in the presence of a platinum compound as a catalyst.

As the organopolysiloxane having an alkenyl group, there can be mentioned, for example, dimethylpolysiloxanes having vinyldimethylsiloxy groups on both the molecule ends and organopolysiloxanes having methylvinylsiloxy groups on some of the intermediate siloxane units.

As the organohydrogenpolysiloxane having a trialkoxysilyl group-containing hydrocarbon group and a hydrogen atom bonded to the silicon atom, there can be mentioned, for example, the following compounds having in the molecule one or two hydrogen atoms bonded to the silicon atom:

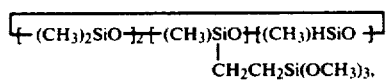

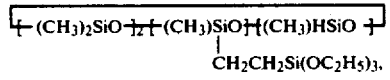

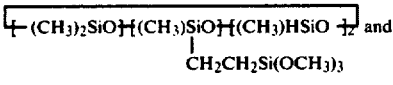

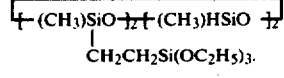

As the organohydrogenpolysiloxane having an epoxy group-containing hydrocarbon group and a hydrogen atom bonded to the silicon atom, there can be mentioned, for example, the following compounds having in the molecule one or two hydrogen atoms bonded to the silicon atom:

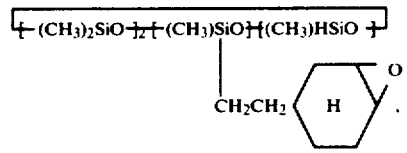

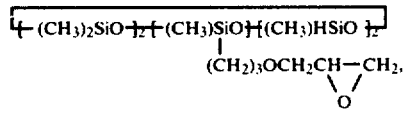

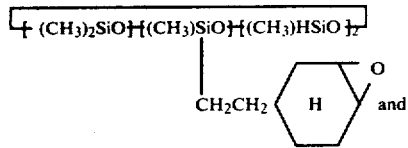

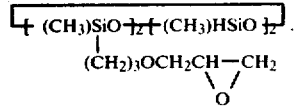

As the organohydrogenpolysiloxane having an ester group-containing hydrocarbon group and a hydrogen atom bonded to the silicon atom, there can be mentioned, for example, the following compounds having in the molecule one or two hydrogen atoms bonded to the silicon atom:

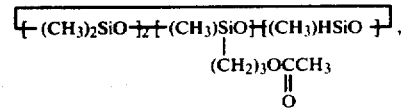

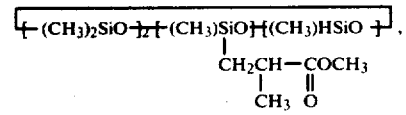

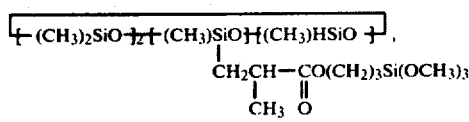

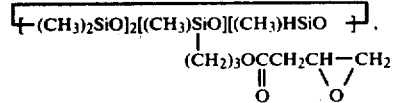

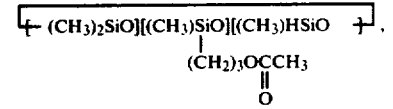

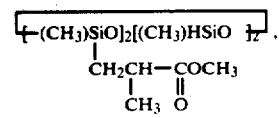

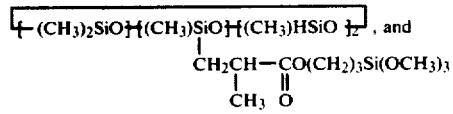

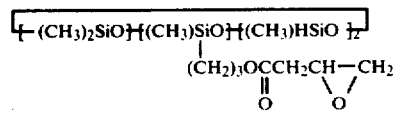

When an organohydrogenpolysiloxane having two hydrogen atoms bonded to the silicon atom is employed, it reacts with 2 molecules of a linear organopolysiloxane having an alkenyl group to form a partially cyclized linear organopolysiloxane having an alkenyl group and a trialkoxysilyl, epoxy or ester group.

There can be used as the organopolysiloxane (A), compounds having the formula

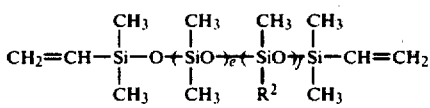

wherein e is a number from 0 to 2,000 and f is a number of 1 to 2,000 and compounds having the formula

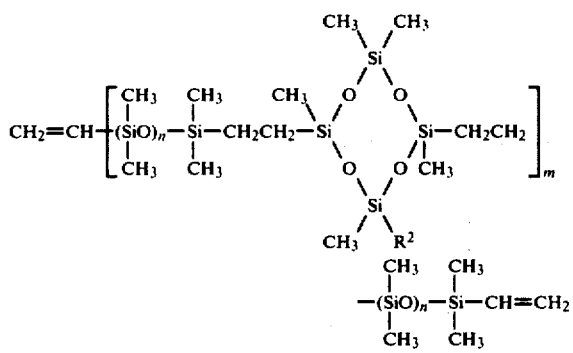

wherein n is a number of 1 to 1,000 and m is a number of 1 to 50.

The organohydrogenpolysiloxane used as the component (B) in the present invention should have at least 3 hydrogen atoms bonded to silicon atoms so as to reticulate the composition by a cross-linking reaction. As $R^3$ and the organic groups bonded to silicon atoms of other siloxane units, there can be mentioned the same groups as exemplified above with respect to $R^1$ of the component (A). From the viewpoint of easiness in the synthesis, a methyl group is most preferred. Such organohydrogenpolysiloxane may be any of linear, branched and cyclic organohydrogenpolysiloxanes, but linear and branched organohydrogenpolysiloxanes described hereinafter are especially preferred because they provide cured compositions having excellent physical properties.

(1) Branched organohydrogenpolysiloxanes consisting of $(CH_3)_2HSiO_{1/2}$ units and $SiO_2$ units in which the content of hydrogen atoms bonded to silicon atoms is in the range of from 0.3 to 1.2% by weight.

(2) Linear organohydrogenpolysiloxanes represented by the following general formula:

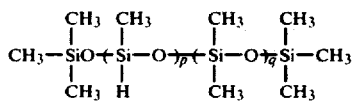

wherein p is a number of 3 to 100 and q is a number of 0 to 100, in which the content of hydrogen atoms bonded to silicon atoms is in the range of from 0.5 to 1.6% by weight.

(3) Linear organohydrogenpolysiloxanes represented by the following general formula:

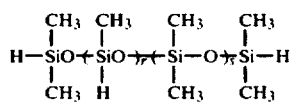

wherein r is a number of 1 to 100 and s is a number of 0 to 100, in which the content of hydrogen atoms bonded to silicon atoms is in the range of from 0.5 to 1.6% by weight.

In the present invention, it is preferred that the amount used of the component (B) be such that the number of hydrogen atoms bonded to silicon atoms in the component (B) is 0.5 to 4.0, preferably 1.0 to 3.0, per alkenyl group in the component (A). If the number of such hydrogen atoms is too small, curing of the composition does not sufficiently proceed and the hardness of the cured composition is low. In contrast, if the number of such hydrogen atoms is too great, the physical properties and heat resistance of the cured composition are insufficient.

A catalyst selected from the group consisting of platinum and platinum compounds is used as the component (C) in the present invention. The catalyst promotes addition reaction between the alkenyl group of the component (A) and the hydrosilyl group of the component (B). As such catalysts, there can be mentioned, for example, elementary platinum, chloroplatinic acid, a platinum-olefin complex, a platinum-alcohol complex and a platinum coordination compound. The component (C) is used in an amount of 1 to 100 ppm as platinum based on the component (A).

An inorganic filler may be added to the composition of the present invention according to need, whereby good properties suitable for the intended uses, such as good flow properties, hardness after curing, high tensile strength, high elongation and high modulus can be imparted. As the inorganic filler, there can be mentioned, for example, fumed silica, silica aerogel, precipitated silica, pulverized silica, diatomaceous earth, iron oxide, zinc oxide, titanium oxide, calcium carbonate, magnesium carbonate, zinc carbonate and carbon black. The amount of the inorganic filler is not particularly critical but rather is optional provided that the intended objects of the present invention can be attained.

Known additives such as vinyltriethoxysilane, γ-glycidoxypropyltrimethoxysilane and γ-methacryloxypropyltrimethoxysilane may be added to the composition of the present invention.

The composition of the present invention is prepared by mixing the above components (A), (B) and (C), and it is cured by heating, preferably at a temperature of up to 120° C., after casting, coating or impregnation. In order to prevent curing during storage, the composition is ordinarily stored in the form of two packs. More specifically, the components (A) and (C) are stored in one pack and the component (B) is stored in another pack, or the component (C) and a part of the component (A) are stored in one pack and the remainder of the component (A) and the component (B) are stored in another pack, though the manner of storage is not particularly limited to the above-mentioned manner. Further, the components (A), (B) and (C) can be stored in one pack if a known addition reaction inhibitor is incorporated.

After casting, coating or impregnation, the organopolysiloxane composition of the present invention is maintained at a temperature approximating 100° C. for about 30 minutes, whereby the composition can be cured in the state tightly bonded to various substrates. The composition of the present invention is advantageous over conventional non-bonding type compositions in various points. For example, the step of coating a primer becomes unnecessary. Furthermore, the present invention is advantageous over the conventional technique of adding an adhesion promoter having a relatively low molecular-weight, because reduction of characteristic properties or change of the adhesiveness or dimensional change by evaporation of the adhesion promoter at the heat curing step can be prevented.

The organopolysiloxane composition of the present invention can be effectively used for potting or impregnation of parts of electronic instruments or for cast molding requiring adhesiveness.

The present invention will now be described in detail by reference to the following Examples in which all of "parts" are by weight.

EXAMPLE 1

To 100 parts of a triethoxysilylethyl group-containing organopolysiloxane represented by the following average formula:

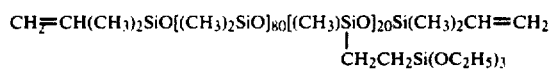

and having a viscosity of about 1,200 cP as measured at 25° C. were added 1.5 parts of an organohydrogenpolysiloxane represented by the following average formula:

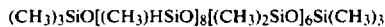

and 0.02 part of a chloroplatinic acid-octanol complex (having a Pt content of 2%), to form a composition of the present invention. The adhesiveness of the composition to various substrates was tested according to the following method.

The composition was inserted between two test panels composed of a substrate material indicated in Table 1, and was cured by heating at 100° C. for 4 hours. The adhesive strength under shear and cohesive failure ratio were determined and results are shown in Table 1.

A comparative composition was prepared in the same manner as described above except that 100 parts of an organopolysiloxane represented by the following average formula:

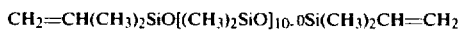

was used instead of the triethoxysilylethyl group-containing organopolysiloxane, and the adhesiveness of the comparative composition was tested in the same manner as described above and results are shown in Table 1.

TABLE 1

| Substrate | Composition of Present Invention | | Comparative Composition | |
|---|---|---|---|---|
| | Adhesive strength under shear (kg/cm$^2$) | Cohesive failure ratio (%) | Adhesive strength under shear (kg/cm$^2$) | Cohesive failure ratio (%) |
| aluminum | 2.1 | 100 | 0.2 | 0 |
| stainless steel | 1.9 | 100 | 0.1 | 0 |
| phenolic resin | 1.9 | 100 | 0.1 | 0 |
| polyester resin | 1.7 | 100 | 0.1 | 0 |
| epoxy resin | 1.9 | 100 | 0.1 | 0 |

The composition of the present invention, the comparative composition and a composition obtained by adding 3 parts of a cyclic tetrasiloxane having the following formula:

$$\left[ -(CH_3)HSiO \right]_3 \left[ (CH_3)SiO - \right] \\ | \\ CH_2CH_2Si(OC_2H_5)_3$$

to 100 parts of the comparative composition were tested in the following manner.

A 50 cc-capacity glass beaker was charged with precisely measured 5 g of the sample, and the sample was heated at 100° C. for 24 hours. The samples other than the sample of the comparative composition were tightly bonded to the beakers. The weight losses by heating were 0.29% and 0.35% in the samples of the composition of the present invention and the comparative composition, respectively. The weight loss by heating was 1.4% in the sample of the cyclic tetrasiloxane-incorporated comparative composition. The heated sample of the composition of the present invention was colorless and transparent as the heated samples of the other compositions.

EXAMPLE 2

A composition was prepared by mixing 100 parts of a triethoxysilylethyl group-containing organopolysiloxane represented by the following average formula:

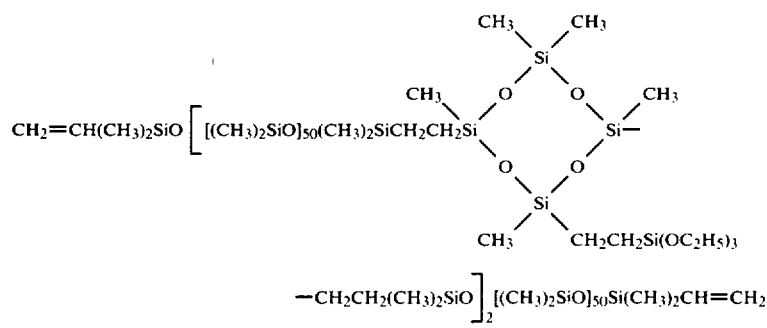

with 2 parts of an organohydrogensiloxane represented by the following average formula:

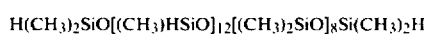

0.02 part of an ethanol solution of chloroplatinic acid (the Pt content being 4%), 10 parts of fumed titanium oxide and 50 parts of pulverized silica having an average particle size of 5μ. The composition was inserted in a thickness of 1 mm between two glass sheets and heated at 100° C. for 5 hours to effect curing. It was found that the composition had a good adhesiveness. The adhesive strength under shear was 7.3 kg/cm² and the cohesive failure ratio was 100%.

EXAMPLE 3

A composition was prepared by mixing 100 parts of a trimethoxysilylethyl group-containing organopolysiloxane represented by the following average formula:

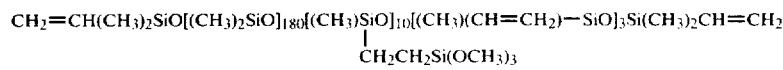

with 4 parts of a methylhydrogenpolysiloxane consisting of $H(CH_3)_2SiO_{\frac{1}{2}}$ units and $SiO_2$ units in which the content of hydrogen atoms bonded to silicon atoms was 0.9% by weight, 10 parts of fumed silica having a specific surface area of 200 m²/g, 6 parts of zinc oxide having an average particle size of 5μ and 0.05 part of an isopropanol solution of chloroplatinic acid (the Pt content being 2%). The composition was inserted in a thickness of 1 mm between aluminum plates and heated at 100° C. for 5 hours to effect curing. It was found that the composition had a good adhesiveness. The adhesive strength under shear was 9.2 kg/cm² and the cohesive failure ratio was 100%.

EXAMPLE 4

To 100 parts of an epoxy group-containing organopolysiloxane represented by the following average formula:

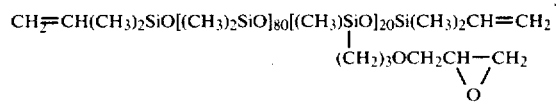

and having a viscosity of about 1,300 cP as measured at 25° C. were added 1.5 parts of an organohydrogenpolysiloxane represented by the following average formula:

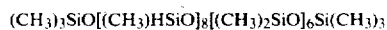

and 0.02 part of a chloroplatinic acid-octanal complex (having a Pt content of 2%), to form a composition of the present invention. The adhesiveness of the composition to various substrates was tested according to the following method.

The composition was inserted between two test panels composed of a substrate material indicated in Table 2, and it was cured in this state by heating at 100° C. for 4 hours. The adhesive strength under shear and cohesive failure ratio were determined to obtain results shown in Table 2.

A comparative composition was prepared in the same manner as described above except that 100 parts of an organopolysiloxane represented by the following average formula:

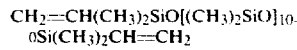

was used instead of the epoxy group-containing organopolysiloxane, and the adhesiveness of the comparative composition was tested in the same manner as described above to obtain results shown in Table 2.

TABLE 2

| Substrate | Composition of Present Invention | | Comparative Composition | |
|---|---|---|---|---|
| | Adhesive strength under shear (kg/cm²) | Cohesive failure ratio (%) | Adhesive strength under shear (kg/cm²) | Cohesive failure ratio (%) |
| Aluminum | 2.0 | 100 | 0.2 | 0 |
| stainless steel | 1.8 | 100 | 0.1 | 0 |
| phenolic resin | 1.9 | 100 | 0.1 | 0 |
| polyester resin | 1.7 | 100 | 0.1 | 0 |
| epoxy resin | 1.8 | 100 | 0.1 | 0 |

The composition of the present invention, the comparative composition and a composition obtained by adding 3 parts of a cyclic tetrasiloxane having the following formula:

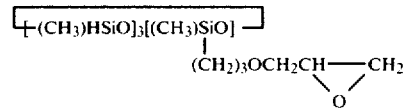

to 100 parts of the comparative composition were tested in the following manner.

A 50 cc-capacity glass beaker was charged with precisely measured 5 g of the sample, and the sample was heated at 100° C. for 24 hours. The samples other than the sample of the comparative composition were tightly bonded to the beakers. The weight losses by heating were 0.28% and 0.35% in the samples of the composition of the present invention and the comparative composition, respectively. The weight loss by heating was 1.3% in the sample of the cyclic tetrasiloxane-incorporated comparative composition. The heated sample of the composition of the present invention was colorless and transparent as the heated samples of the other compositions.

EXAMPLE 5

In the presence of 0.01 part of a 2-ethylhexyl alcohol solution of chloroplatinic acid (having a Pt content of 3%), 100 parts of a vinyl group-containing organopolysiloxane represented by the following average formula:

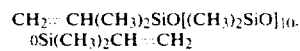

and 2 parts of an epoxy group-containing organohydrogenpolysiloxane represented by the following formula:

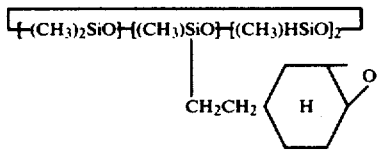

were heated under agitation at 80° C. for 1 hour to obtain an organopolysiloxane represented by the following average formula:

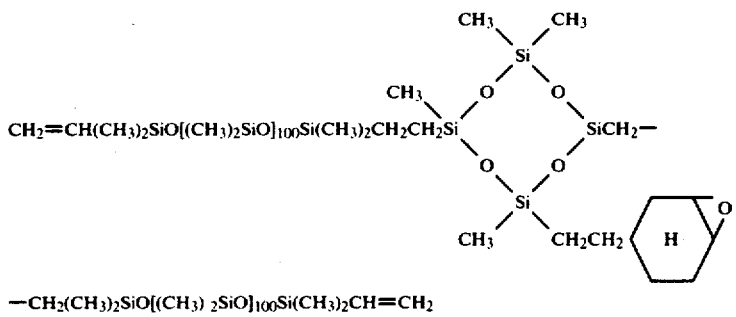

—CH$_2$(CH$_3$)$_2$SiO[(CH$_3$)$_2$SiO]$_{100}$Si(CH$_3$)$_2$CH=CH$_2$ and a viscosity of 1,800 cP as measured at 25° C.

A composition was prepared by mixing this organopolysiloxane (without removal of the platinum catalyst) with 2 parts of an organohydrogenpolysiloxane represented by the following average formula:

(CH$_3$)$_3$SiO[(CH$_3$)HSiO]$_{18}$[(CH$_3$)$_2$SiO]$_{10}$Si(CH$_3$)$_3$ and the composition was inserted in a thickness of 1 mm between two aluminum plates having a size of 50 mm×25 mm×1 mm and heated at 100° C. for 5 hours to effect curing. It was found that the composition had a good adhesiveness. The adhesive strength under shear was 2.5 kg/cm$^2$ and the cohesive failure ratio was 100%.

EXAMPLE 6

A composition was prepared by mixing 100 parts of an epoxy group-containing organopolysiloxane represented by the following average formula:

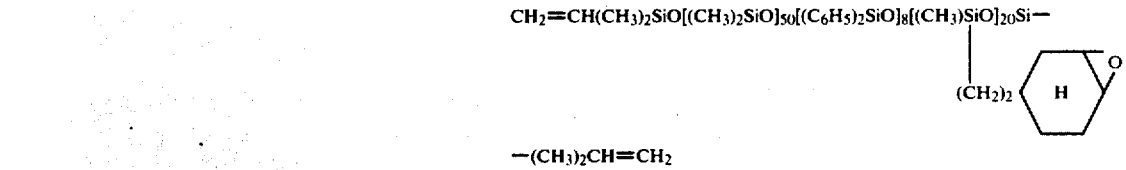

with 2.5 parts of a methylhydrogenpolysiloxane consisting of H(CH$_3$)$_2$SiO$_{\frac{1}{2}}$ units and SiO$_2$ units in which the content of hydrogen atoms bonded to silicon atoms was 0.8% by weight, and 0.05 parts of an isopropanol solution of chloroplatinic acid (the Pt content being 2%). The composition was inserted in a thickness of 1 mm between aluminum plates and heated and cured at 100° C. for 5 hours in the same manner as in Example 5. It was found that the composition had a good adhesiveness. The adhesive strength under shear to the glass substrate was 4.4 kg/cm$^2$ and the cohesive failure ratio was 100%.

EXAMPLE 7

A composition was prepared by mixing 100 parts of an epoxy group-containing organopolysiloxane represented by the following average formula:

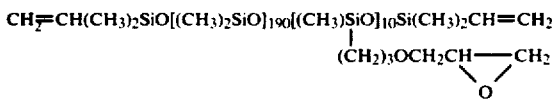

—(CH$_3$)$_2$CH=CH$_2$ with 2 parts of an organohydrogensiloxane represented by the following average formula:

H(CH$_3$)$_2$SiO[(CH$_3$)HSiO]$_{12}$[(CH$_3$)$_2$SiO]$_8$Si(CH$_3$)$_2$H and 0.08 part of a complex of octanol with chloroplatinic acid (the Pt content being 2%). The composition was inserted between two glass sheets and heated at 100° C. for 5 hours to effect curing in the same manner as in Example 5. It was found that the composition had a good adhesiveness. The adhesive strength under shear to the glass substrate was 4.0 kg/cm$^2$ and the cohesive failure ratio was 100%.

EXAMPLE 8

A composition was prepared by mixing 100 parts of an epoxy group-containing organopolysiloxane represented by the following average formula:

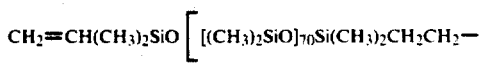

-continued

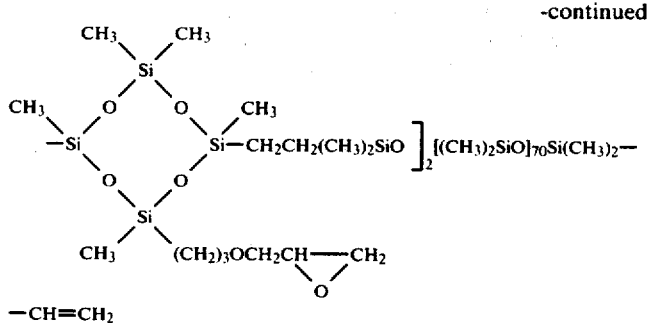

which had been prepared in the same manner as in Example 5 by using a cyclic organopolysiloxane represented by the following formula:

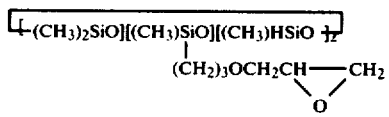

(0.02 part of an octanol complex of chloroplatinic acid having a Pt content of 2% was used for the synthesis and it was not removed), with 1.2 parts of an organohydrogenpolysiloxane represented by the following average formula:

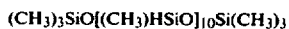

8 parts of fumed silica having a specific surface area of 200 m²/g, and 5 parts of zinc oxide having an average particle size of 5 μ. The composition was inserted in a thickness of 1 mm between test panels shown in Table 3 and heated at 100° C. for 5 hours to effect curing. It was found that the composition had a good adhesiveness. The adhesive strength under shear and cohesive failure ratio were determined to results shown in Table 3.

A comparative composition was prepared in the same manner as described above except that 100 parts of an organopolysiloxane represented by the following average formula:

$$CH_2=CH(CH_3)_2SiO[(CH_3)_2SiO]_7.$$
$$oSi(CH_3)_2CH=CH_2$$

was used instead of the epoxy group-containing organopolysiloxane, and the adhesiveness of the comparative composition was tested in the same manner as described above. In each case, the cohesive failure ratio was 0%.

TABLE 3

| Substrate | Adhesive strength under sheat (kg/cm²) | Cohesive failure ratio (%) |
|---|---|---|
| Aluminum | 10.4 | 100 |
| stainless steel | 10.2 | 100 |
| glass | 11.8 | 100 |
| phenolic resin | 10.6 | 100 |
| epoxy resin | 12.0 | 100 |

EXAMPLE 9

A composition was prepared by mixing 100 parts of an epoxy group-containing organopolysiloxane represented by the following average formula:

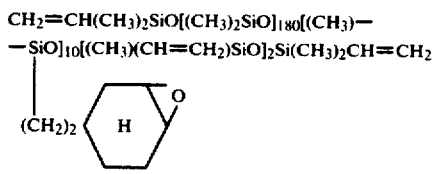

with 1.2 parts of an organohydrogensiloxane represented by the following average formula:

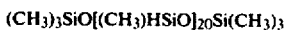

0.1 part of a platinum complex (the Pt content being 0.5%) formed by heating chloroplatinic acid with tetramethyltetravinylcyclotetrasiloxane and 50 parts of pulverized silica having an average particle size of 5μ. The composition was inserted between two glass sheets and heated at 100° C. for 5 hours to effect curing in the same manner as in Example 5. It was found that the composition had a good adhesiveness. The adhesive strength under shear to the glass substrate was 8.5 kg/cm² and the cohesive failure ratio was 100%.

EXAMPLES 10 and 11

Compositions prepared in the same manner as in Example 4 by using 100 parts of an epoxy group-containing organopolysiloxane having an average formula shown below instead of the epoxy group-containing organopolysiloxane used in Example 4, and the compositions were cured between aluminum panels in the same manner as in Example 4. In each case, a good adhesiveness was obtained and the cohesive failure ratio was 100%.

EXAMPLE 10

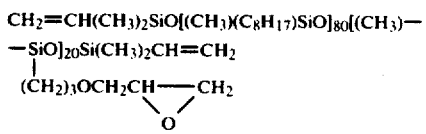

EXAMPLE 11

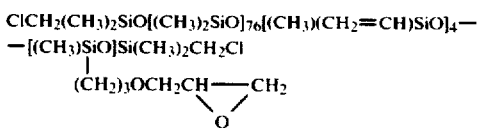

EXAMPLE 12

To 100 parts of an ester linkage-containing organopolysiloxane represented by the following average formula:

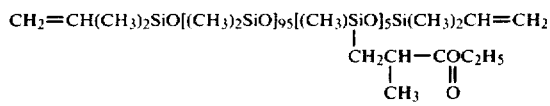

and having a viscosity of about 800 cP as measured at 25° C. were added 1.5 parts of an organohydrogenpolysiloxane represented by the following average formula:

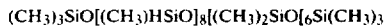

and 0.02 part of a chloroplatinic acid-octanol complex (having a Pt content of 2%), to form a composition of the present invention. The adhesiveness of the composition to various substrates was tested according to the following method.

The composition was inserted between two test panels composed of a substrate material indicated in Table 4, and it was cured in this state by heating at 100° C. for 4 hours. The adhesive strength under shear and cohesive failure ratio were determined to obtain results shown in Table 4.

A comparative composition was prepared in the same manner as described above except that 100 parts of an organopolysiloxane represented by the following average formula:

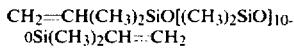

was used instead of the ester linkage-containing organopolysiloxane, and the adhesiveness of the comparative composition was tested in the same manner as described above to obtain results shown in Table 4.

TABLE 4

| Substrate | Composition of Present Invention | | Comparative Composition | |
|---|---|---|---|---|
| | Adhesive strength under shear (kg/cm$^2$) | Cohesive failure ratio (%) | Adhesive strength under shear (kg/cm$^2$) | Cohesive failure ratio (%) |
| aluminum | 2.1 | 100 | 0.2 | 0 |
| stainless steel | 1.7 | 100 | 0.1 | 0 |
| phenolic resin | 1.9 | 100 | 0.1 | 0 |
| polyester resin | 2.0 | 100 | 0.1 | 0 |
| epoxy resin | 1.7 | 100 | 0.1 | 0 |

The composition of the present invention, the comparative composition and a composition obtained by adding 3 parts of a cyclic tetrasiloxane having the following formula:

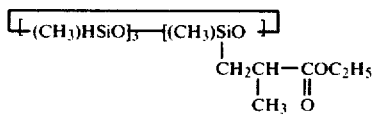

to 100 parts of the comparative composition were tested in the following manner.

A 50 cc-capacity glass beaker was charged with precisely measured 5 g of the sample, and the sample was heated at 100° C. for 24 hours. The samples other than the sample of the comparative composition were tightly bonded to the beakers. The weight losses by heating were 0.26% and 0.35% in the samples of the composition of the present invention and the comparative composition, respectively. The weight loss by heating was 1.2% in the sample of the cyclic tetrasiloxane-incorporated comparative composition.

EXAMPLE 13

A composition was prepared by mixing 100 parts of an ester linkage-containing organopolysiloxane represented by the following average formula:

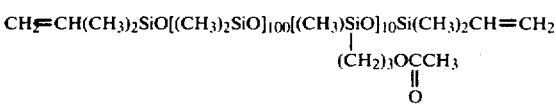

with 3 parts of a methylhydrogenpolysiloxane consisting of H(CH$_3$)$_2$SiO$_{\frac{1}{2}}$ units and SiO$_2$ units in which the content of hydrogen atoms bonded to silicon atoms was 1.0% by weight, 0.01 part of an isopropanol solution of chloroplatinic acid (the Pt content being 3%) and 50 parts of pulverized silica having an average particle size of 5μ. The composition was inserted in a thickness of 1 mm between two aluminum sheets having a size of 50 mm × 25 mm × 1 mm and heated at 100° C. for 5 hours to effect curing. It was found that the composition had a good adhesiveness. The adhesive strength under shear was 9.5 kg/cm$^2$ and the cohesive failure ratio was 100%.

EXAMPLE 14

A composition was prepared by mixing 100 parts of an ester linkage-containing organopolysiloxane represented by the following average formula:

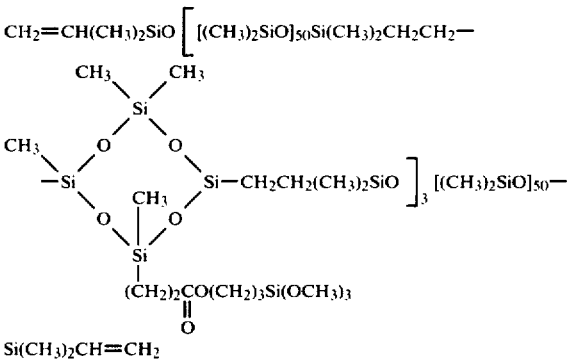

with an organohydrogensiloxane represented by the following average formula:

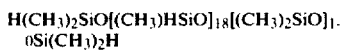

0.02 part of an ethanol solution of chloroplatinic acid (the Pt content being 4%), 10 parts of titanium oxide and 50 parts of pulverized silica having an average particle size of 5μ. The composition was inserted in a thickness of 1 mm between two glass sheets and heated at 100° C. for 5 hours to effect curing. It was found that the composition had a good adhesiveness. The adhesive strength under shear was 7.8 kg/cm² and the cohesive failure ratio was 100%.

EXAMPLE 15

A composition was prepared by mixing 100 parts of an ester linkage-containing organopolysiloxane represented by the following average formula:

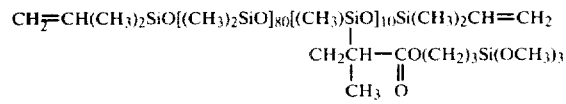

with 2 parts of an organohydrogensiloxane represented by the following average formula:

(CH₃)₃SiO[(CH₃)HSiO]₈[(CH₃)₂SiO]₆Si(CH₃)₃

8 parts of fumed silica having a specific surface area of 200 m²/g, 5 parts of zinc oxide having an average particle size of 5μ and 0.02 part of an octanol complex with chloroplatinic acid (the Pt content being 2%). The composition was inserted in a thickness of 1 mm between test panels shown in Table 5 and heated at 100° C. for 5 hours to effect curing. The adhesive strength under shear and the cohesive failure ratio were determined to obtain results shown in Table 5.

A comparative composition was prepared in the same manner as described above except that 100 parts of an organopolysiloxane represented by the following average formula:

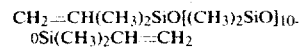

was used instead of the ester linkage-containing organopolysiloxane, and the adhesiveness of the comparative composition was tested in the same manner as described above. In each case, the cohesive failure ratio was 0%.

TABLE 5

| Substrate | Adhesive strength under shear (kg/cm²) | Cohesive failure ratio (%) |
|---|---|---|
| aluminum | 10.5 | 100 |
| stainless steel | 10.4 | 100 |
| glass | 11.5 | 100 |
| polyester resin | 9.8 | 100 |
| phenolic resin | 10.3 | 100 |
| epoxy resin | 10.5 | 100 |

EXAMPLE 16

A composition was prepared by mixing 100 parts of an ester linkage-containing organopolysiloxane represented by the following average formula:

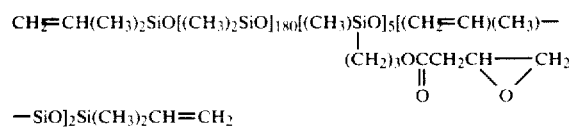

with 1.5 parts of an organohydrogensiloxane represented by the following average formula:

(CH₃)₃SiO[(CH₃)HSiO]₁₂Si(CH₃)₃

0.02 part of an octanol complex with chloroplatinic acid (the Pt content being 2%), 5 parts of fumed titanium oxide and 5 parts of pulverized silica having an average particle size of 5μ. The composition was inserted in a thickness of 1 mm between two aluminum plates and heated at 100° C. for 5 hours to effect curing. It was found that the composition had a good adhesiveness. The adhesive strength under shear was 9.9 kg/cm² and the cohesive failure ratio was 100%.

What we claim is:

1. A curable organopolysiloxane composition consisting essentially of (A) an organopolysiloxane containing in the molecule at least one unit having the formula:

$$R^1_a R^2_b SiO_{\frac{(4-a-b)}{2}}$$

wherein $R^1$ is a substituted or unsubstituted monovalent hydrocarbon group, $R^2$ is a monovalent hydrocarbon group substituted with a trialkoxysilyl group which is bonded to the silicon atom through a chain containing at least 2 carbon atoms, a is 0, 1 or 2, b is 1 or 2, and the sum of a plus b is 1, 2 or 3, said organopolysiloxane also containing in the molecule at least alkenyl groups bonded to silicon atoms, said organopolysiloxane having a viscosity of 50 to 1,000,000 cP measured at 25° C., (B) an organohydrogenpolysiloxane having units of the formula:

$$R^3_c H_d SiO_{\frac{(4-c-d)}{2}}$$

wherein $R^3$ is a substituted or unsubstituted monovalent hydrocarbon groups, c is 0, 1 or 2 and d is 1 or 2, and containing in the molecule at least 3 hydrogen atoms bonded to silicon atoms, the amount of said organohydrogenpolysiloxane being such that from 0.5 to 4.0 of hydrogen atoms bonded to silicon atoms are present per alkenyl group in said organopolysiloxane (A), and (C) a catalyst selected from the group consisting of platinum and platinum compounds in an amount of 1 to 100 ppm, calculated as platinum, based on said organopolysiloxane (A).

2. An organopolysiloxane composition as set forth in claim 1 wherein the alkenyl groups of said organopolysiloxane (A) are vinyl groups.

3. An organopolysiloxane composition as set forth in claim 2 wherein $R^2$ is a β-trialkoxysilylethyl having the formula:

(R⁴O)₃SiCH₂CH₂— wherein $R^4$ is a monovalent hydrocarbon group having from one to four carbon atoms.

4. An organopolysiloxane composition as set forth in claim 2 in which $R^2$ is β-trimethoxysilylethyl.

5. An organopolysiloxane composition as set forth in claim 1 wherein said organopolysiloxane (A) is a vinyl group-containing organopolysiloxane having the formula:

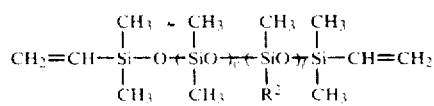

wherein e is a number of 0 to 2,000 and f is a number of 1 to 2,000.

6. An organopolysiloxane composition as set forth in claim 1 wherein said organopolysiloxane (A) is a vinyl group-containing organopolysiloxane having the formula:

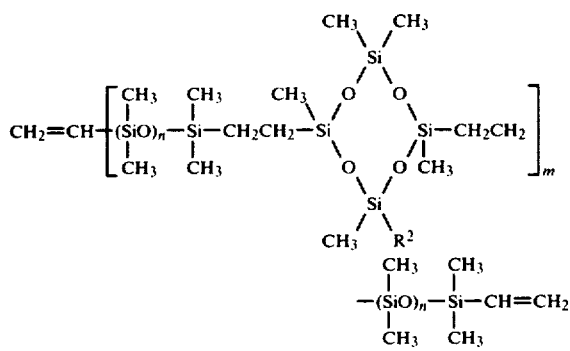

wherein n is a number of 1 to 1,000 and m is a number of 1 to 50.

7. An organopolysiloxane composition as set forth in claim 1 wherein said organohydrogenpolysiloxane (B) consists of $(CH_3)_2HSiO_{\frac{1}{2}}$ units and $SiO_2$ units in which the content of hydrogen atoms bonded to silicon atoms is 0.3 to 1.2% by weight.

8. An organopolysiloxane composition as set forth in claim 1 wherein said organohydrogenpolysiloxane (B) has the formula:

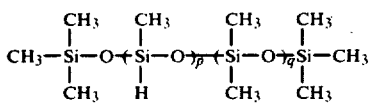

wherein p is a number of 3 to 100 and q is a number of 0 to 100, and the content of hydrogen atoms bonded to silicon atoms is 0.5 to 1.6% by weight.

9. An organopolysiloxane composition as set forth in claim 1 wherein said organohydrogenpolysiloxane (B) has the formula:

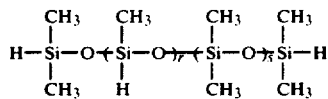

wherein r is a number of 1 to 100 and s is a number of 0 to 100, and the content of hydrogen atoms bonded to silicon atoms is 0.5 to 1.6% by weight.

10. An organopolysiloxane composition as set forth in claim 1 which further comprises an inorganic filler.

11. An organopolysiloxane composition as claimed in claim 1 in which said organopolysiloxane (A) has a viscosity of 100 to 10,000 cP measured at 25° C.

12. A curable organopolysiloxane composition consisting essentially of (A) an organopolysiloxane containing in the molecule at least one unit having the formula:

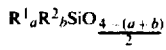

wherein $R^1$ is a substituted or unsubstituted monovalent hydrocarbon group, $R^2$ is selected from the group consisting of (1) a monovalent hydrocarbon group substituted with a monovalent group containing an oxycarbonyl group in which said oxycarbonyl group is bonded to the silicon atom by a chain containing at least 1 carbon atom and (2) a monovalent group containing a trialkoxysilyl group and an oxycarbonyl group in which said oxycarbonyl group is bonded to the silicon atom by a chain containing at least 1 carbon atom, a is 0, 1 or 2, b is 1 or 2, and the sum of a plus b is 1, 2 or 3, said organopolysiloxane also containing in the molecule at least 2 alkenyl groups bonded to silicon atoms, said organopolysiloxane having a viscosity of 50 to 1,000,000 cP measured at 25° C., (B) an organohydrogenpolysiloxane having units of the formula:

wherein $R^3$ is a substituted or unsubstituted monovalent hydrocarbon group, c is 0, 1 or 2 and d is 1 or 2, and containing in the molecule at least 3 hydrogen atoms bonded to silicon atoms, the amount of said organohydrogenpolysiloxane being such that from 0.5 to 4.0 of hydrogen atoms bonded to silicon atoms are present per alkenyl group in said organopolysiloxane (A), and (C) a catalyst selected from the group consisting of platinum and platinum compounds in an amount of 1 to 100 ppm, calculated as platinum, based on said organopolysiloxane (A).

13. An organopolysiloxane composition as set forth in claim 12 wherein the alkenyl groups of said organopolysiloxane (A) are vinyl groups.

14. An organopolysiloxane composition as set forth in claim 12 wherein $R^2$ is said monovalent hydrocarbon group substituted with a monovalent group containing an oxycarbonyl group.

15. An organopolysiloxane composition as set forth in claim 12 wherein $R^2$ is selected from the group consisting of

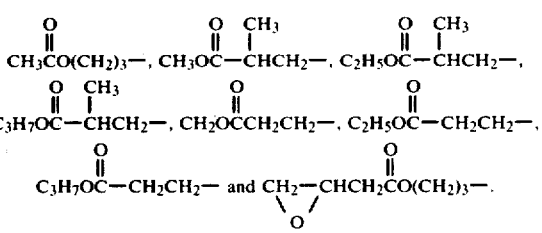

16. An organopolysiloxane as set forth in claim 12 wherein $R^2$ has the formula:

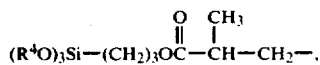

and $R^4$ is a monovalent hydrocarbon group having 1 to 4 carbon atoms.

17. An organopolysiloxane composition as set forth in claim 12 wherein the organopolysiloxane (A) is a vinyl group-containing organopolysiloxane having the formula:

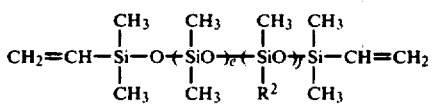

wherein e is a number of 0 to 2,000 and f is a number of 1 to 2,000.

18. An organopolysiloxane composition as set forth in claim 12 wherein the organopolysiloxane (A) is a vinyl group-containing organopolysiloxane having the formula:

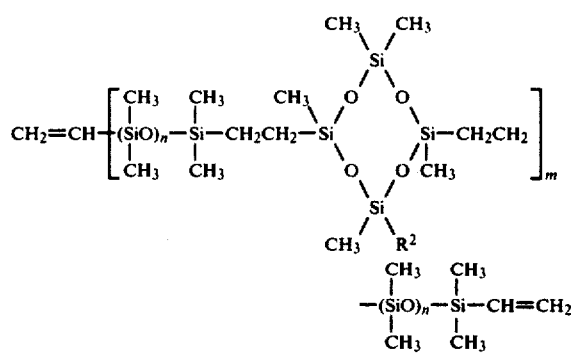

wherein n is a number of 1 to 1,000 and m is a number of 1 to 50.

19. An organopolysiloxane composition as set forth in claim 12 wherein, and organohydrogenpolysiloxane (B) consists of $(CH_3)_2HSiO_{\frac{1}{2}}$ units and $SiO_2$ units in which the content of hydrogen atoms bonded to silicon atoms is 0.3 to 1.2% by weight.

20. An organopolysiloxane composition as set forth in claim 12 wherein said organohydrogenpolysiloxane (B) has the formula:

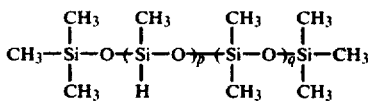

wherein p is a number of 3 to 100 and q is a number of 0 to 100, and the content of hydrogen atoms bonded to silicon atoms is 0.5 to 1.6% by weight.

21. An organopolysiloxane composition as set forth in claim 12 wherein said organohydrogenpolysiloxane (B) has the formula:

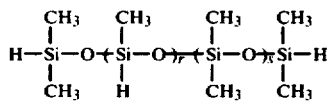

wherein r is a number of 1 to 100 and s is a number of 0 to 100, and the content of hydrogen atoms bonded to silicon atoms is 0.5 to 1.6% by weight.

22. An organopolysiloxane composition as set forth in claim 12 which further comprises an inorganic filler.

23. An organopolysiloxane composition as claimed in claim 12 in which said organopolysiloxane (A) has a viscosity of 100 to 10,000 cP measured at 25° C.

24. A curable organopolysiloxane composition consisting essentially of (A) an organopolysiloxane containing in the molecule at least one unit having the formula:

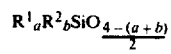

wherein $R^1$ is a substituted or unsubstituted monovalent hydrocarbon group, $R^2$ is a substituted monovalent hydrocarbon group substituted with a monovalent group containing an epoxy group, a is 0, 1 or 2, b is 1 or 2, and the sum of a plus b is 1, 2 or 3, said organopolysiloxane also containing in the molecule at least 2 alkenyl groups bonded to silicon atoms, said organopolysiloxane having a viscosity of 50 to 1,000,000 cP measured at 25° C., (B) an organohydrogenpolysiloxane having units of the formula:

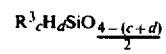

wherein $R^3$ is a substituted or unsubstituted monovalent hydrocarbon group, c is 0, 1 or 2 and d is 1 or 2, and containing in the molecule at least 3 hydrogen atoms bonded to silicon atoms, the amount of said organohydrogenpolysiloxane being such that from 0.5 to 4.0 of hydrogen atoms bonded to silicon atoms are present per alkenyl group in said organopolysiloxane (A), and (C) a catalyst selected from the group consisting of platinum and platinum compounds in an amount of 1 to 100 ppm, calculated as platinum, based on said organopolysiloxane (A).

25. An organopolysiloxane composition as set forth in claim 24 wherein the alkenyl groups of said organopolysiloxane (A) are vinyl groups.

26. An organopolysiloxane composition as set forth in claim 24 wherein said organopolysiloxane (A) is a vinyl group-containing organopolysiloxane having the formula:

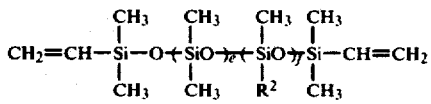

wherein e is a number of 0 to 2,000 and f is a number of 1 to 2,000.

27. An organopolysiloxane composition as set forth in claim 24 wherein said organopolysiloxane (A) is a vinyl group-containing organopolysiloxane having the formula:

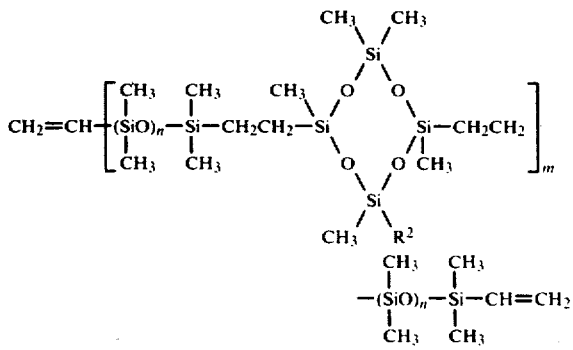

wherein n is a number of 1 to 1,000 and m is a number of 1 to 50.

28. An organopolysiloxane composition as set forth in claim 24 wherein $R^2$ is γ-glycidyloxypropyl.

29. An organopolysiloxane composition as set forth in claim 24 wherein $R^2$ is β-(3,4-oxycyclohexyl)ethyl.

30. An organopolysiloxane composition as set forth in claim 24 wherein said organohydrogenpolysiloxane (B) consists of $(CH_3)_2HSiO_{\frac{1}{2}}$ units and $SiO_2$ units in which the content of hydrogen atoms bonded to silicon atoms is 0.3 to 1.2% by weight.

31. An organopolysiloxane composition as set forth in claim 24 wherein said organohydrogenpolysiloxane (B) has the formula:

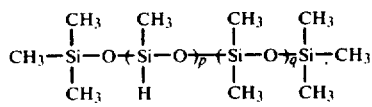

wherein p is a number of 3 to 100 and q is a number of 0 to 100, and the content of hydrogen atoms bonded to silicon atoms is 0.5 to 1.6% by weight.

32. An organopolysiloxane composition as set forth in claim 24 wherein said organohydrogenpolysiloxane (B) has the formula:

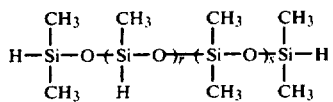

wherein r is a number of 1 to 100 and s is a number of 0 to 100, and the content of hydrogen atoms bonded to silicon atoms is 0.5 to 1.6% by weight.

33. An organopolysiloxane composition as set forth in claim 24 which further comprises an inorganic filler.

34. An organopolysiloxane composition as claimed in claim 24 in which said organopolysiloxane (A) has a viscosity of 100 to 10,000 cP measured at 25° C.

* * * * *